(12) United States Patent
Sharma

(10) Patent No.: US 11,457,454 B2
(45) Date of Patent: *Sep. 27, 2022

(54) COMMUNICATIONS SYSTEM FOR ADDRESSING INTERFERENCES IN THE COMMUNICATION NETWORK

(71) Applicant: NEC Corporation, Tokyo (JP)

(72) Inventor: Vivek Sharma, Sutton (GB)

(73) Assignee: NEC CORPORATION, Tokyo (JP)

(*) Notice: Subject to any disclaimer, the term of this patent is extended or adjusted under 35 U.S.C. 154(b) by 61 days.

This patent is subject to a terminal disclaimer.

(21) Appl. No.: 16/923,510

(22) Filed: Jul. 8, 2020

(65) Prior Publication Data

US 2020/0344765 A1 Oct. 29, 2020

Related U.S. Application Data

(63) Continuation of application No. 14/768,518, filed as application No. PCT/JP2014/060447 on Apr. 4, 2014, now Pat. No. 10,728,902.

(30) Foreign Application Priority Data

Apr. 9, 2013 (GB) .................................. 1306438

(51) Int. Cl.
*H04W 72/08* (2009.01)
*H04W 72/04* (2009.01)
*H04W 88/06* (2009.01)

(52) U.S. Cl.
CPC ....... *H04W 72/082* (2013.01); *H04W 72/042* (2013.01); *H04W 88/06* (2013.01)

(58) Field of Classification Search
None
See application file for complete search history.

(56) References Cited

U.S. PATENT DOCUMENTS

2012/0040620 A1 2/2012 Fu et al.
2012/0213162 A1* 8/2012 Koo ..................... H04W 16/14
370/329

(Continued)

FOREIGN PATENT DOCUMENTS

JP 2013-538499 A 10/2013
WO 2012/019561 A1 2/2012

(Continued)

OTHER PUBLICATIONS

3rd Generation Partnership Project;Technical Specification Group Radio Access Network;"Evolved Universal Terrestrial Radio Access (E-UTRA) and Evolved Universal Terrestrial Radio Access Network (E-UTRAN) Overall description;Stage 2 (Release 11)", (Mar. 2013), 3GPP TS 36.300 V11.5.0 Cited in the Specification and ISR.

(Continued)

*Primary Examiner* — Ayanah S George
(74) *Attorney, Agent, or Firm* — Sughrue Mion, PLLC

(57) ABSTRACT

A mobile communications system is described in which a mobile device is operable to communicate with base stations using a first radio technology and with other devices using a second radio technology. The mobile device maintains a control plane connection with a first base station and a user plane connection via a second base station. In case of an interference is detected due to concurrent use of the first and second radio technologies, the mobile device provides assistance information to the base stations, based on which the base stations alleviate the effects of the detected interference.

6 Claims, 8 Drawing Sheets

(56) References Cited

U.S. PATENT DOCUMENTS

2015/0131558 A1* 5/2015 Van Lieshout ... H04W 36/0005
370/329
2015/0282200 A1 10/2015 Lee et al.

FOREIGN PATENT DOCUMENTS

| WO | 2012094933 A1 | 7/2012 | | |
|---|---|---|---|---|
| WO | 2012/108711 A2 | 8/2012 | | |
| WO | WO-2012108711 A2 * | 8/2012 | ........ | H04W 72/1215 |
| WO | 2013025026 A2 | 2/2013 | | |

OTHER PUBLICATIONS

3rd Generation Partnership Project;Technical Specification Group Radio Access Network;"Evolved Universal Terrestrial Radio Access (E-UTRA);Radio Resource Control (RRC);Protocol specification(Release 11)",(Mar. 2013), 3GPP TS 36.331 V11.3.0 Cited in the Specification.

3rd Generation Partnership Project;Technical Specification Group Radio Access Network;"Scenarios and requirements for small cell enhancements for E-UTRA and E-UTRAN (Release 12)",(Mar. 2013), 3GPP TR 36.932 V12.1.0 Cited in the Specification.

3GPP TSG RAN WG2 Meeting #81 R2-130271,"RRM and mobility enhancements of small cell deployment scenarios" Jan. 28-Feb. 1, 2013, Agenda item: 7.2 Cited in ISR.

Hiroyuki Ishii et al: "A novel architecture for LTE-B :C-plane/U-plane split and Phantom Cell concept", Globecom Workshops (GC Wkshps), 2012 IEEE,IEEE,Dec. 3, 2012 (Dec. 3, 2012), pp. 624-630, XP032341446,DOI: 10.1109/GLOCOMW.2012.6477646 ISBN: 978-1-4673-4942-0 Cited in ISR.

International Search Report for PCT Application No. PCT/JP2014/060447, dated Aug. 28, 2014.

3rd Generation Partnership Project; Technical Specification Group Radio Access Network; "Connectivity Models for Small Cell Enhancement", LG Electronics Inc., 3GPP TSG-RAN WG2 #81, R2-130314, St. Julian's, Malta, Jan. 28-Feb. 1, 2013.

3rd Generation Partnership Project; Technical Specification Group Radio Access Network; "Dual Connectivity for Small Cell Enhancements", Sharp, 3GPP TSG-RAN WG2 #81, R2-130538, St. Julian's, Malta, Jan. 28-Feb. 1, 2013.

Japanese Office Action for JP Application No. 2015-562684 dated Aug. 24, 2016.

* cited by examiner

COMMUNICATIONS SYSTEM FOR ADDRESSING INTERFERENCES IN THE COMMUNICATION NETWORK

REFERENCE TO RELATED APPLICATION

The present application is a Continuation application of Ser. No. 14/768,518 filed on Aug. 18, 2015, which is a National Stage Entry of PCT/JP2014/060447 filed on Apr. 4, 2014, which claims priority from United Kingdom Patent Application 1306438.1 filed on Apr. 9, 2013, the contents of all of which are incorporated herein by reference, in their entirety.

TECHNICAL FIELD

The present invention relates to radio access networks in a cellular or wireless telecommunications network, and particularly but not exclusively to networks operating according to the 3GPP standards or equivalents or derivatives thereof. The invention has particular although not exclusive relevance to the Long Term Evolution (LTE) of UTRAN (called Evolved Universal Terrestrial Radio Access Network (E-UTRAN)) and to avoiding or reducing interference for mobile devices communicating with such networks; especially interference caused by, or to, non-LTE radio technologies used by the devices in addition to the LTE radio technology.

BACKGROUND ART

In a cellular communications network, mobile devices (also known as User Equipment (UE) or mobile terminals, such as mobile telephones) communicate with remote servers or with other mobile devices via base stations. An LTE base station is also known as an 'enhanced NodeB' (eNB). When a mobile device attaches to the LTE network via a base station, a core network entity called Mobility Management Entity (MME) sets up a default Evolved Packet System (EPS) Bearer between the mobile device and a gateway in the core network. An EPS Bearer defines a transmission path through the network and assigns an IP address to the mobile device to be used by the mobile device to communicate with remote servers or other mobile devices. An EPS Bearer also has a set of data transmission characteristics, such as quality of service, data rate and flow control parameters, which are defined by the subscription associated with the mobile device and are established by the MME upon registration of the mobile device with the network.

The EPS Bearer is thus managed by the MME, which signals to the mobile device when it needs to activate, modify, or deactivate a particular EPS Bearer. Thus there are two connections between the mobile device and the communication network: one for the user data transmitted using the established EPS bearer (also known as the user plane or U-plane) and another one for managing the EPS Bearer itself (also known as the control plane or C-plane)

In their communication with each other, mobile devices and base stations use licensed radio frequencies, which are typically divided into frequency bands and/or time blocks. Depending on various criteria (such as the amount of data to be transmitted, radio technologies supported by the mobile device, expected quality of service, subscription settings, etc.), each base station is responsible for controlling the transmission timings, frequencies, transmission powers, modulations, etc. employed by the mobile devices attached to the base station. In order to minimise disruption to the service and to maximise utilisation of the available bandwidth, the base stations continuously adjust their own transmission power and also that of the mobile devices. Base stations also assign frequency bands and/or time slots to mobile devices, and also select and enforce the appropriate transmission technology to be used between the base stations and the attached mobile devices. By doing so, base stations also reduce or eliminate any harmful interference caused by mobile devices to each other or to the base stations.

In order to optimise utilisation of their bandwidth, LTE base stations receive periodic signal measurement reports from each served mobile device, which contain information about the perceived signal quality on a given frequency band used by (or being a candidate frequency band for) that mobile device. These signal measurement reports are then used by the base stations in their decision to allocate certain parts of their bandwidth to the served mobile devices and also to hand over mobile devices to other base stations (or other frequency bands/other radio access technologies (RATs)) when the signal quality does not meet the established criteria. The handing over of a mobile device might be necessary, for example, when the mobile device has moved away from the given base station, and also when an interference problem has arisen.

Current mobile devices typically support multiple radio technologies, not only LTE. The mobile devices might include, for example, transceivers and/or receivers operating in the Industrial, Scientific and Medical (ISM) radio bands, such as Bluetooth or Wi-Fi transceivers. Furthermore, mobile devices might also include positioning functionality and associated circuitry, for example Global Navigation Satellite System (GNSS) transceivers and/or receivers. Both ISM and GNSS (hereafter commonly referred to as non-LTE) radio technologies use frequency bands close to or partially overlapping with the LTE frequency bands. Some of these non-LTE frequency bands are licensed for a particular use (e.g. Global Positioning Systems (GPS) bands) or might be unlicensed bands and can be used by a number of radio technologies (such as Bluetooth and Wi-Fi standards using the same range of ISM frequency bands). The manner in which these non-LTE frequency bands are used are, therefore, not covered by the LTE standards and are not controlled by the LTE base stations. However, transmissions in the non-LTE frequency bands might, nevertheless, still cause undesired interference to (or suffer undesired interference resulting from) transmissions in the LTE bands, particularly in the overlapping or neighbouring frequency bands.

Such non-LTE radio technologies might be used by the mobile device itself or by other mobile devices in their vicinity and, although these radio technologies conform to the relevant standards (i.e. other than LTE), might still cause undesired interference to (or suffer interference from) the LTE transmission of these mobile devices. This is especially true when the end user is operating an ISM transceiver in parallel with the LTE transceiver, for example when the user is making a voice over IP (VoIP) call using a Bluetooth headset. It will be appreciated that in this case the LTE and ISM transmissions will interfere with each other as the LTE voice data received from the base station is relayed to the headset using the ISM transceiver implemented in the same mobile device. Thus any signal quality measurements performed by this mobile device before the VoIP call would not correspond to the actual signal quality perceived during the call. Furthermore, since an LTE base station can control only the mobile device's (and its own) LTE transmissions, any corrective measures made by the base station would inevitably fail to improve the interference perceived by the mobile device because of the concurrently operated ISM transceiver.

In another typical scenario, the LTE transceiver of the mobile device can cause interference to the GNSS receiver (e.g. a GPS receiver) making it difficult to obtain a current location of the mobile device. In this case, although there is no apparent disruption to the LTE signal (the signal quality measurements by the mobile device would indicate acceptable signal conditions), the LTE transmissions by the mobile device would be likely to render the GNSS functionality unusable because of the interference caused by the LTE transceiver to the GNSS receiver of the mobile device.

When interference such as this arises as a result of communication occurring concurrently in the same mobile device (for example, concurrent use of LTE and non-LTE radio technologies) the interference is sometimes referred to as 'in-device coexistence (IDC) interference' which causes an 'in-device coexistence (IDC) situation'.

For mobile devices using the standard frequency bands simultaneously for LTE and ISM/GNSS radio communications, the typical in-device coexistence scenarios include:
  LTE Band 40 radio transmitter causing interference to ISM radio receiver;
  ISM radio transmitter causing interference to LTE Band 40 radio receiver;
  LTE Band 7 radio transmitter causing interference to ISM radio receiver;
  LTE Band 7/13/14 radio transmitter causing interference to GNSS radio receiver.

However, other bands and/or other radio technologies might also experience interference due to LTE/ISM/GNSS transmissions.

In order to be able to alleviate the problems due to IDC interference, the mobile device indicates its IDC capability to its serving base station. If the received IDC capability of the mobile device indicates that the mobile device is able to do so, the serving base station configures the mobile device (by providing so-called 'idc-config' settings) to address IDC interference autonomously. Therefore, when the mobile device experiences interference due to an IDC situation, it can adjust its LTE and/or non-LTE transmissions in accordance with the 'idc-config' settings, thereby reducing or eliminating the experienced interference. In particular, the mobile device is allowed by the network to 'deny' (i.e. suspend or delay) its (already scheduled and hence expected) LTE transmissions up to a limit/rate specified in the 'idc-config' parameters. Essentially, this allows the mobile telephone to temporarily override the LTE scheduling decisions made by the network and to carry out ISM signalling and whilst its LTE transmissions are 'autonomously' suspended.

However, some IDC interference situations cannot be solved by the mobile device by itself, even if an 'idc-config' has been provided by the base station. In this case, the mobile device may need to send an IDC indication to the network (e.g. in an uplink RRC message) to inform the network about the IDC situation. To address such situations, 3GPP standards provide three techniques, using which the network (i.e. an LTE base station) is able to provide a solution when the mobile device cannot solve the problem by itself. The three techniques comprise: a TDM (Time Division Multiplexing) solution, an FDM (Frequency Division Multiplexing) solution, and a Power Control solution. It will be appreciated that 'solution' as used herein refers to control and/or configuration data that may be used by the mobile device to eliminate, or at least mitigate, the effects of the detected interference.

The TDM solution ensures that the transmission of a radio signal does not coincide with the reception of another radio signal. The FDM solution consists of choosing another serving frequency for the mobile device than the one suffering from interference. The Power Control solution aims to reduce radio transmission power to mitigate the effect of interference.

In order to benefit from these techniques, if the mobile device detects that an IDC situation is causing interference, it informs the base station (e.g. using Radio Resource Control (RRC) layer signalling) that an IDC situation has arisen and it provides assistance information (sometimes referred to as an 'IDC assistance indication') using which the base station is able to select the most appropriate technique to address the interference caused by the IDC situation. For example, the base station may select a different frequency for the mobile device indicating the IDC situation (FDM solution). Alternatively, the base station may reconfigure the transmission (e.g. apply discontinuous reception (DRX) and/or change its subframe pattern) (TDM solution) for that mobile device. The base station may also adjust its (or initiate adjustment of the mobile device's) transmission power (Power Control solution).

Further details of these techniques can be found in section 23.4 of the 3GPP TS 36.300 standards document (v.11.5.0). Details of the 'idc-config' settings can be found in the 3GPP TS 36.331 standards document (v.11.3.0). The contents of both documents are incorporated herein by reference.

However, the above solutions are not always applicable for the so-called small cell enhancement scenarios defined in 3GPP TR 36.932 (v.12.1.0). 'Small cells' in this context refer to the coverage areas of low-power nodes (for example Pico eNBs or Femto eNBs) that are being considered for LTE in order to support mobile traffic explosion, especially for indoor and outdoor hotspot deployments. A low-power node generally refers to a node that is operating a cell ('small cell') with a typical transmit power which is lower than typical transmit powers used in cells of macro nodes and base stations ('macro cells').

In particular, some of the small cell enhancement scenarios are based on a split control-plane/user-plane architecture (referred to as 'C/U Split'), in which the mobile device is configured to maintain its control plane connection with the communication network via a macro cell (operating as a primary cell or 'Pcell') and at the same time maintain its user plane connection via one or more 'small cells' (operating as secondary cell or 'Scell') and thereby reducing the load in the macro cell. Effectively, in this case the mobile device is using two separate radio connections via two separate nodes (i.e. a macro base station and a low-power node), one for sending/receiving user data, and another one for controlling the mobile device's operations, such as mobility management, security control, authentication, setting up of communication bearers, etc.

In such situations, interference may occur on either radio connection. However, the mobile device is configured to receive its 'idc-config' settings (if any) from the macro base station, which settings are adapted to handle IDC situations arising in the macro cell (which carries the control plane only, in case of C/U-plane split) and thus cannot be used to tackle user plane interference experienced in the small cell. Even if the 'idc-config' would be adapted and/or applied to small cells (or both macro cells and small cells), due to the relatively large number of small cells, and their possibly differing operating characteristics (compared to the macro cell and also to other small cells), such 'idc-config' would not be capable of addressing all the different possible IDC situations.

Furthermore, the mobile device can only send an IDC assistance indication to the macro base station (via which it has a control plane connection), not the low-power node handling its user plane connection. However, given the relatively lower transmit power level used by the low-power node, user plane transmissions via the small cell might be more sensitive to interference than control plane transmission via the macro cell.

Even in the case when the mobile device experiences interference on the control plane and notifies this to the macro base station, any change in the macro base station's operation may cause unexpected interference for the user plane connection via the small cell.

There is therefore a need to improve the operation of the mobile device, the base station, and the low-power node in order to overcome or at least alleviate the above problems.

SUMMARY OF INVENTION

Embodiments of the present invention aim to provide improved techniques for alleviating interference in a communications network and, in particular, for alleviating radio interference caused to, or by, transmissions between a mobile communication device and nodes of a mobile (cellular) communication.

In one aspect, the present invention provides a mobile device comprising: first communicating means for communicating with a first and a second base station using a first radio technology; second communicating means for communicating with a wireless communications device using a second radio technology; means for detecting interference arising as a result of coexistence of said first and second radio technologies within said mobile device; providing means for providing, to said first base station and responsive to detecting said interference arising as a result of said coexistence, coexistence information identifying at least one parameter associated with communicating with said second base station; and receiving means for receiving from at least one of said first and second base stations, responsive to providing said coexistence information, control information for alleviating said interference; wherein said first communicating means is operable to control communication with the first and/or the second base stations, based on said control information, whereby to alleviate the detected interference.

The first communicating means may be operable to communicate control data via said first base station and to communicate user data via said second base station. In this case, the first communicating means may be further operable to communicate user data via said first base station.

The first communicating means may be operable to communicate control data and user data via said first base station and to elect said second base station as a candidate for communicating user data. In this case, said control information for alleviating said interference may comprise control data causing said first communicating means to continue communicating control data and user data via said first base station. Alternatively, the first communicating means may be operable to elect a different base station than said second base station as a candidate for communicating user data.

The control data may cause said first communicating means to alleviate the detected interference by applying a frequency division multiplexing (FDM) solution. In this case, the control information for alleviating said interference may comprise control data causing said first communicating means to communicate user data via a different base station than said second base station. For example, the different base station may be the first base station.

The control data may cause said first communicating means to alleviate the detected interference by applying a time division multiplexing (TDM) solution. In this case, the control information for alleviating said interference may comprise control data causing said first communicating means to prevent communication of user data and/or control data whilst said second communicating means is communicating with said wireless communications device using said second radio technology.

The providing means may be operable to provide said coexistence information to said first base station and the receiving means may be operable to receive said control information via said second base station.

The mobile device may further comprise means for providing information relating to a capability of the mobile device to address in-device coexistence interference and the control information for alleviating said interference may be dependent on said capability of the mobile device.

The providing means for providing coexistence information and the receiving means for receiving control information may be operable to exchange Radio Resource Control (RRC) messages with the base station.

The first radio technology may be a radio technology according to the Long Term Evolution (LTE) standard. The second radio technology may be a radio technology according to any one of the Bluetooth, Wi-Fi, and GPS standards.

In another aspect, the invention provides a mobile device comprising a transceiver and a processor, wherein: said transceiver is configured to: communicate with a first and a second base station using a first radio technology; and communicate with a wireless communications device using a second radio technology. The processor is configured to detect interference arising as a result of coexistence of said first and second radio technologies within said mobile device. The transceiver is configured to: provide, to said first base station and responsive to detecting said interference arising as a result of said coexistence, coexistence information identifying at least one parameter associated with communicating with said second base station; and receive from at least one of said first and second base stations, responsive to providing said coexistence information, control information for alleviating said interference. The transceiver communicating using said first radio technology is operable to control communication with the first and/or the second base stations, based on said control information, whereby to alleviate the detected interference.

In yet another aspect, the invention provides a base station comprising: communicating means for communicating with a mobile device using a first radio technology; means for exchanging control data with another base station relating to said mobile device; receiving means for receiving, from said mobile device, an indication that interference has arisen as a result of coexistence of said first radio technology and a second radio technology in said mobile device, said indication comprising coexistence information identifying at least one parameter associated with communicating with said other base station; means for generating control information for alleviating said interference between said first and second radio technologies based on said coexistence information; and sending means for sending the generated control information to the mobile device to alleviate the interference.

The control information may comprise configuration data. For example, the configuration data may comprise an in-device coexistence configuration data (e.g. 'idc-config' data). The control information may also comprise an instruction to modify an operating parameter of the first and/or the second radio technology.

The communicating means may be operable to communicate control data for said mobile device via said first base station and to communicate user data for said mobile device via said second base station. In this case, the communicating means may be further operable to communicate user data for said mobile device via said first base station.

The communicating means may be operable to communicate control data and user data for said mobile device via said first base station and to elect said second base station as a candidate for communicating user data for said mobile device. In this case, the communicating means may be operable to continue communicating control data and user data for said mobile device via said first base station. Alternatively, the communicating means may be operable to elect a different base station than said second base station as a candidate for communicating user data for said mobile device.

The control data may cause said mobile device to alleviate the detected interference by applying a frequency division multiplexing (FDM) solution. In this case, the control information for alleviating said interference may comprise control data causing said communicating means to communicate user data via a different base station than said second base station. For example, the different base station may be said first base station.

The control data may cause said mobile device to alleviate the detected interference by applying a time division multiplexing (TDM) solution. In this case, the control information for alleviating said interference may comprise control data causing said mobile device to prevent communication of user data and/or control data whilst said mobile device is communicating with said wireless communications device using said second radio technology.

The control information may comprise an autonomous denial rate (ADR) configuration. In this case, the ADR configuration may be for communications via said second base station.

The control information may comprise a discontinuous reception (DRX) configuration. In this case, the DRX configuration may be for communications via said second base station.

The control information may comprise a hybrid automatic retransmission request (HARQ) configuration. In this case, the HARQ configuration may be for communications via said second base station.

The receiving means may be operable to receive said coexistence information directly from said mobile device and said sending means may be operable to send said control information to said mobile device via said second base station.

The base station may further comprise obtaining means for obtaining information relating to a capability of the mobile device to address in-device coexistence interference and the control information for alleviating said interference may be dependent on said capability of the mobile device.

The obtaining means may be operable to obtain said capability information form said second base station. The obtaining means may also be operable to obtain said capability information form said mobile device. In this case, the obtaining means may be operable to obtain said capability information form said mobile device via said second base station.

The obtaining means may be operable to receive said capability information in at least one message. The at least one message includes at least one information element (IE) selected from the following information elements: an information element comprising an indication of a capability of said second base station (e.g. a 'Pico IDC Capabilty' IE), an information element comprising parameters for an autonomous denial functionality (e.g. an 'Autonomous Denial Parameters' IE), an information element comprising assistance information for said mobile device (e.g. a 'UE Assistance Information' IE), an information element comprising a DRX configuration for said mobile device to be applied for a cell of said first base station (e.g. a 'drx-config_Pcell' IE), an information element comprising a DRX configuration for said mobile device to be applied for a cell of said second base station (e.g. a 'drx-config_Scell' IE), an information element comprising a sub-frame pattern for said mobile device (e.g. a 'Sub-frame Pattern' IE), and an information element comprising TDM assistance information for said mobile device to be applied for a cell of said second base station (e.g. a 'Tdm-AssistanceInformationScell' IE).

The receiving means for receiving said coexistence information and the sending means for sending said control information may be operable to exchange Radio Resource Control (RRC) messages with the mobile device.

In a further aspect, the invention provides a base station comprising a transceiver and a processor, wherein: said transceiver is configured to: communicate with a mobile device using a first radio technology; exchange control data with another base station relating to said mobile device; receive, from said mobile device, an indication that interference has arisen as a result of coexistence of said first radio technology and a second radio technology in said mobile device, said indication comprising coexistence information identifying at least one parameter associated with communicating with said other base station. The processor is configured to generate control information for alleviating said interference between said first and second radio technologies based on said coexistence information; and the transceiver is configured to send the generated control information to the mobile device to alleviate the interference.

The invention also provides a system comprising the above described mobile device, the first base station, and the other base station.

In a further aspect, the invention provides a method performed by a mobile device configured to communicate with a first and a second base station using a first radio technology and to communicate with a wireless communications device using a second radio technology, the method comprising: detecting interference arising as a result of coexistence of said first and second radio technologies within said mobile device; providing, to said first base station and responsive to detecting said interference arising as a result of said coexistence, coexistence information identifying at least one parameter associated with communicating with said second base station; and receiving from at least one of said first and second base stations, responsive to providing said coexistence information, control information for alleviating said interference; wherein said communicating using said first radio technology is arranged to control communication with the first and/or the second base stations, based on said control information, whereby to alleviate the detected interference.

The invention also provides a method performed by a base station configured to communicate with a mobile device using a first radio technology, the method comprising: exchanging control data with another base station relating to said mobile device; receiving, from said mobile device, an indication that interference has arisen as a result of the coexistence of said first radio technology and a second radio technology in said mobile device, said indication comprising coexistence information identifying at least one parameter associated with communicating with said other base station; generating control information for alleviating said interference between said first and second radio technologies based on said coexistence information; and sending the generated control information to the mobile device to alleviate the interference.

Aspects of the invention extend to computer program products such as computer readable storage media having instructions stored thereon which are operable to program a programmable processor to carry out a method as described in the aspects and possibilities set out above or recited in the claims and/or to program a suitably adapted computer to provide the apparatus recited in any of the claims.

BRIEF DESCRIPTION OF DRAWINGS

Exemplary embodiments of the invention will now be described, by way of example, with reference to the accompanying drawings in which.

MODE FOR CARRYING OUT THE INVENTION

Overview

Figure 1:
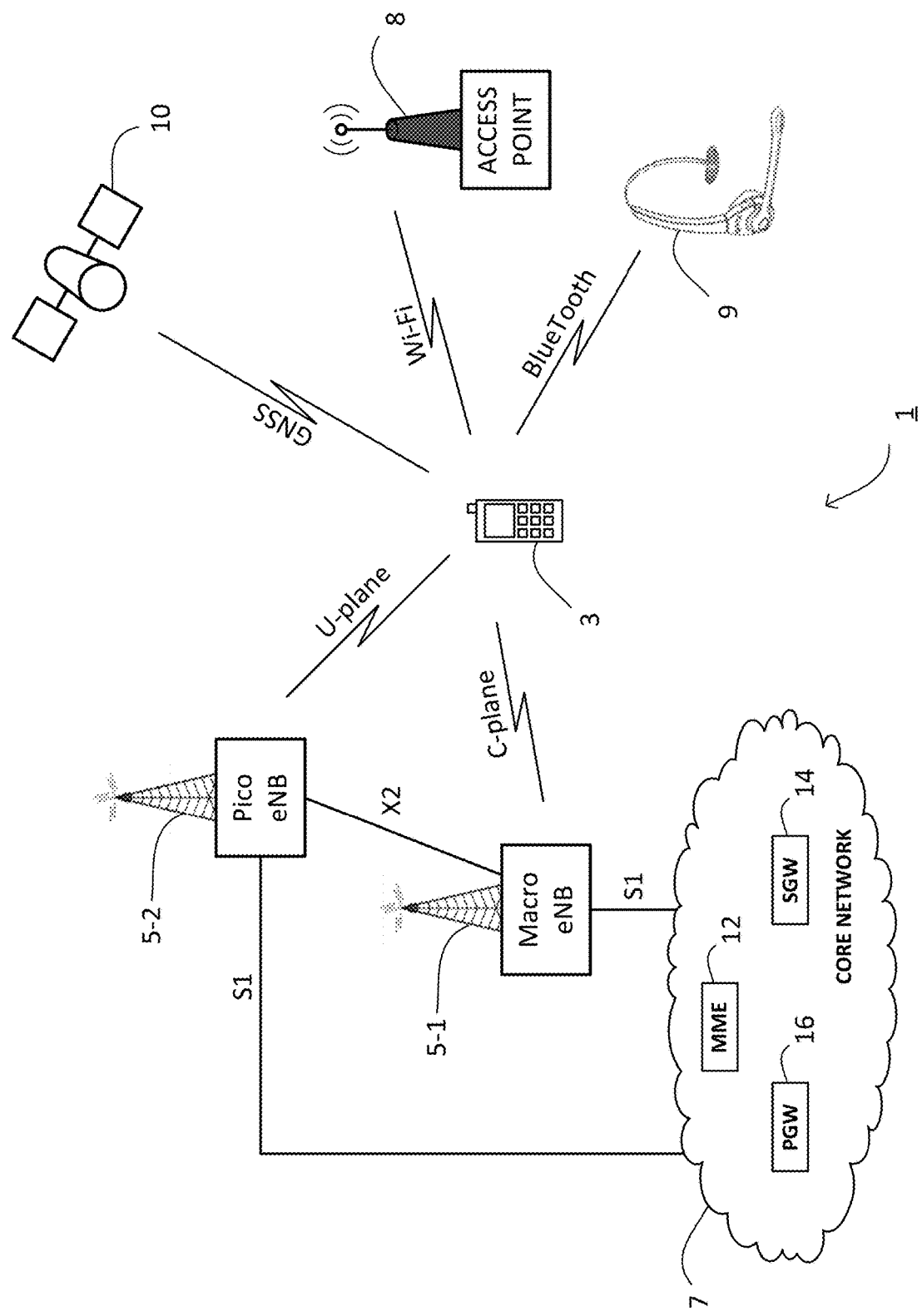
FIG. 1 schematically illustrates a mobile telecommunication system of a type to which the invention is applicable.

FIG. 1 schematically illustrates a mobile (cellular) telecommunication system 1 in which users of mobile devices 3 (for example mobile telephones) can communicate with other users via each of a plurality of base stations 5-1, 5-2 and a core network 7. In the system illustrated in FIG. 1, the base station 5-1 is a macro base station and the base station 5-2 is a pico base station (or other low-power node). Further base stations (not shown) might operate according to different standards, such as the Wideband Code Division Multiple Access (W-CDMA) or the GSM (Global System for Mobile Communications) EDGE (Enhanced Data rates for GSM Evolution) Radio Access Network (GERAN) standards or the like.

The core network 7 comprises a mobility management entity (MME) 12, a serving gateway (SGW) 14, and a PDN gateway (PGW) 16.

Each base station 5 operates at least one base station cell, each having a number of uplink and downlink communications resources (channels, sub-carriers, time slots, etc.) that are available for wireless communication between the mobile device 3 and the corresponding base station 5. In this exemplary embodiment, it will be assumed, for the sake of simplicity of explanation, that the mobile device 3 has one user plane connection and one control plane connection with two respective base stations 5, although, in deployed systems, a mobile device 3 might have multiple user plane connections and multiple control plane connections with several base stations in parallel. In this example, the Radio Access Technologies (RATs) employed by the base stations 5 operate according to either Frequency Division Duplexing (FDD) or Time Division Duplexing (TDD).

In TDD, the time domain of a communication channel (of a base station 5) is divided into several recurrent time slots of fixed length in which communication to/from the base station 5 can be scheduled. In operation in TDD, two or more data streams may be transferred between the base station 5 and the mobile device(s) 3, apparently simultaneously, in sub-channels of one communication channel, by scheduling each data stream in different time slots of the channel (effectively 'taking turns'). In FDD, the bandwidth available to the base station 5 is divided into a series of non-overlapping frequency sub-bands each comprising frequency resources that may be assigned to mobile devices 3 for communication via the base station 5.

The serving base station 5 allocates downlink resources to the mobile device 3 depending on the amount of data to be sent to the device. Similarly, the base station 5 allocates uplink resources to the mobile device 3 depending on the amount and type of data the mobile device 3 has to send to the base station 5. The uplink and downlink resources typically comprise physical resource blocks (PRBs) which are blocks of frequency resources in the frequency range used by that particular base station 5.

During allocation of uplink and downlink resources, the serving base station 5 also takes into account the signal quality available on the given frequency used by (or allocated to) the mobile device 3. The serving base station 5 allocates PRBs to the mobile device 3 dynamically, also taking into account the current transmission needs and signal conditions (as reported by the mobile device 3). Base stations 5 generally aim to maximise usage of the available bandwidth so that each mobile device 3 that they are serving has sufficient transmission opportunity, communicates at its optimum transmission power, and does not cause interference to the other mobile devices 3 or to the base stations 5.

Figure 2:
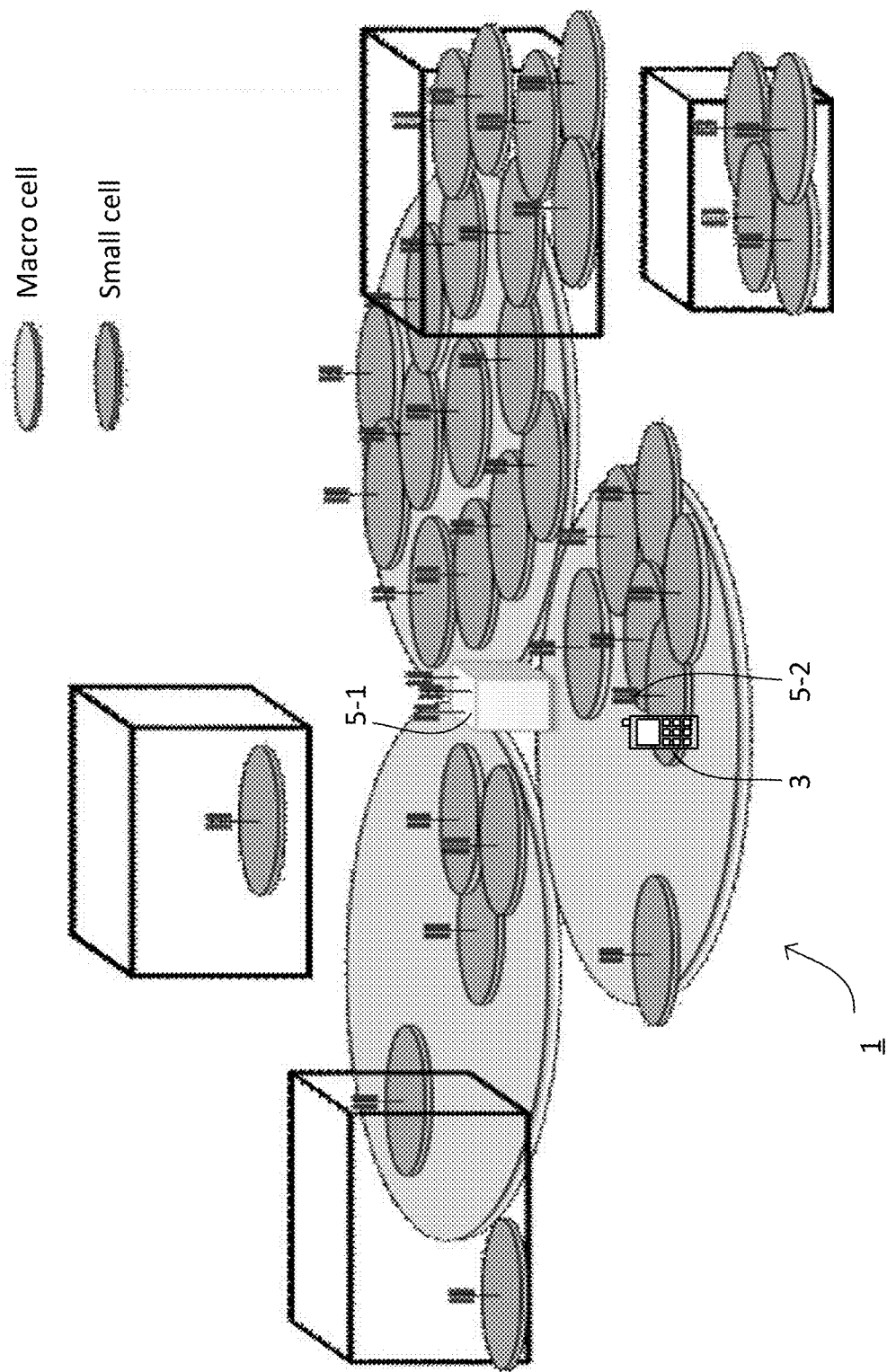
FIG. 2 schematically illustrates an example deployment scenario of the mobile telecommunication system of FIG. 1.

In this exemplary embodiment, initially, the mobile device 3 is connected to the macro base station 5-1 only, either having a control plane connection only (e.g. in an initial phase of attachment to the communication network) or having both its control plane and user plane connections set up via the macro base station 5-1. However, the mobile device 3 is capable to use separate control plane and user plane connections (C/U Split) with the macro base station 5-1 and the pico base station 5-2, respectively. The C/U Split functionality may be triggered by the macro base station 5-1 e.g. due to current network load, signal conditions reported by the mobile device 3, etc. Therefore, when the macro base station 5-1 determines that C/U Split functionality would be favourable (and that it is supported by the mobile device 3), the macro base station 5-1 selects a suitable low-power node (such as the pico base station 5-2) and sets up a new (or moves the existing) user plane connection for that mobile device 3 to the selected node 5-2 (but keeps the control plane connection for this mobile device 3 routed via itself). An exemplary deployment scenario of a mobile telecommunication system having a plurality of low-power nodes is shown in FIG. 2. In this exemplary scenario, the macro base station 5-1 may select the pico base station 5-2 as indicated, if it determines that the cell of this pico base station 5-2 is accessible to the mobile device 3 (i.e. it is within its range, uses compatible technology, has been authorised to use, etc.).

Referring to FIG. 1 again, the mobile device 3 is also capable of communicating using non-LTE radio technologies such as those which use resources of the Industrial, Scientific and Medical (ISM) frequency bands. For example, the mobile device 3 can communicate with a Wi-Fi access point 8 of a Wireless Local Area Network (WLAN) (not shown) operating according to one of the 802.11 family of standards defined by the Institute of Electrical and Electronics Engineers (IEEE). The mobile device 3 can also communicate with a wireless headset 9 operating according to e.g. the Bluetooth standard defined by the Bluetooth Special Interest Group (SIG). In addition, the mobile device 3 also supports positioning technologies and thus communicates with, for example, a positioning satellite 10 using GPS signals.

Communications between the mobile device 3 and the access point 8, the wireless headset 9, and/or the positioning satellite 10 might occur substantially concurrently with the communication between the mobile device 3 and the base station(s) 5, which concurrent communication has the potential to cause undesirable interference (i.e. IDC interference).

Figure 3:
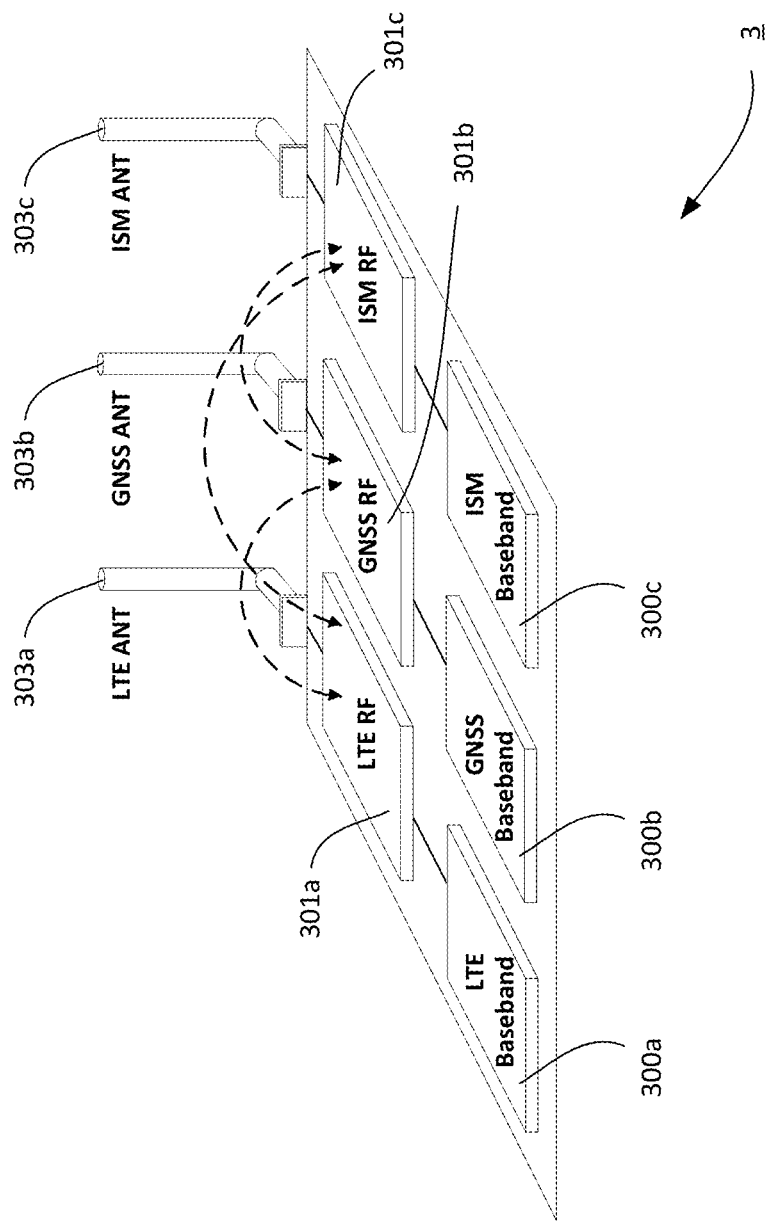
FIG. 3 schematically illustrates various radio transceiver circuits implemented on a mobile device of the mobile telecommunication system shown in FIG. 1.

The issue of IDC interference is illustrated further in FIG. 3 which schematically illustrates, purely illustratively, the various radio transceiver circuits implemented on a mobile device 3 shown in FIG. 1.

As shown in FIG. 3, the mobile device 3 comprises an LTE baseband circuit 300a, a GNSS baseband circuit 300b, and an ISM baseband circuit 300c. Each baseband circuit 300a to 300c is coupled to a radio frequency (RF) transceiver (or receiver), i.e. LTE transceiver 301a, GNSS transceiver 301b, and ISM transceiver 301c, respectively. Communications in the LTE band are carried out using an LTE antenna 303a. Similarly, communications in the non-LTE bands are carried out using the respective GNSS antenna 303b and/or the ISM antenna 303c.

As indicated by dashed arrows in FIG. 3, any of the transceivers 301a to 301c might suffer interference from either one of the other transceivers operating in the same mobile device 3.

Advantageously, the mobile device 3 and the base stations 5 are configured to co-operate to alleviate any such in-device coexistence (IDC) interference.

The mobile device 3 detects the IDC interference and, after establishing information about the nature of the interference the mobile device 3 initially attempts to deal with the interference itself, for example by modifying the timings of the LTE and/or non-LTE radio communications in a time-based solution (as prescribed in its 'idc-config' settings, if available). If this is not sufficiently successful, however, the mobile device 3 generates IDC assistance information and communicates the generated assistance information to the macro base station 5-1, to assist the base stations 5 to take appropriate corrective action for reducing or eliminating the interference. Advantageously, the mobile device 3 includes in the IDC assistance information an indication of whether the interference is related to the control plane and/or the user plane, which cell and which frequency (or frequency band) is experiencing interference, whether any autonomous corrective actions have been applied by the mobile device 3, and so on. To the extent necessary, this information is shared between the macro base station 5-1 and the pico base station 5-2 in order to successfully alleviate interference in both their cells. In addition to this information, the macro base station 5-1 and the pico base station 5-2 also share with each other information relating to their capabilities, preferences, operating parameters, and so on. Beneficially, in this example, such base station specific information is shared before C/U Split functionality is invoked for a particular mobile device 3, e.g. as part of regular connection setup/maintenance procedure between the base stations 5.

Therefore, in this system, the macro base station 5-1 is able to take into account any IDC indication provided by the mobile device 3 and also any information provided by the pico base station 5-2 when managing (e.g. setting up, terminating, reconfiguring) the C/U Split functionality for that device. The macro base station 5-1 exchanges information with the pico base station 5-2 operating as a current (or candidate) low-power node for carrying user plane signalling for the mobile device 3. The information exchanged between the macro base station 5-1 and the pico base station 5-2 may include, for example, information about the capabilities of the mobile device 3, information about the capabilities of the pico base station 5-2, information about the configuration of the pico base station 5-2 (such as a current/preferred/optimal configuration), 'idc-config' settings for the mobile device 3, IDC indication (or part thereof) received from the mobile device 3, control data for controlling the pico base station 5-2 and/or the mobile device 3, etc.

Since the information (other than the IDC indication received from the mobile device 3) is exchanged between the base stations 5 using the X2 interface provided between them, utilisation of the air interface resources can be optimised. However, since the macro base station 5-1 is aware of any existing IDC situation and also the capabilities and settings of both the mobile device 3 and the pico base station 5-2, it can determine the appropriate course of action, and address any IDC interference (regardless whether it is detected for the macro cell or the small cell) in a timely manner and without added complexity to the mobile device 3.

Using the above approach, interference in small cells can be avoided even when the control plane is routed via a different cell (the macro cell). Even in the rare case when it is not possible to completely avoid interference for a user device in a small cell, the pico base station (low-power node) 5-2 operating that small cell can be informed about any arising IDC interference and hence it can mitigate the effect of that interference with minimum disturbance to the user plane connection for the mobile device (user device) 3.

Mobile Device

Figure 4:
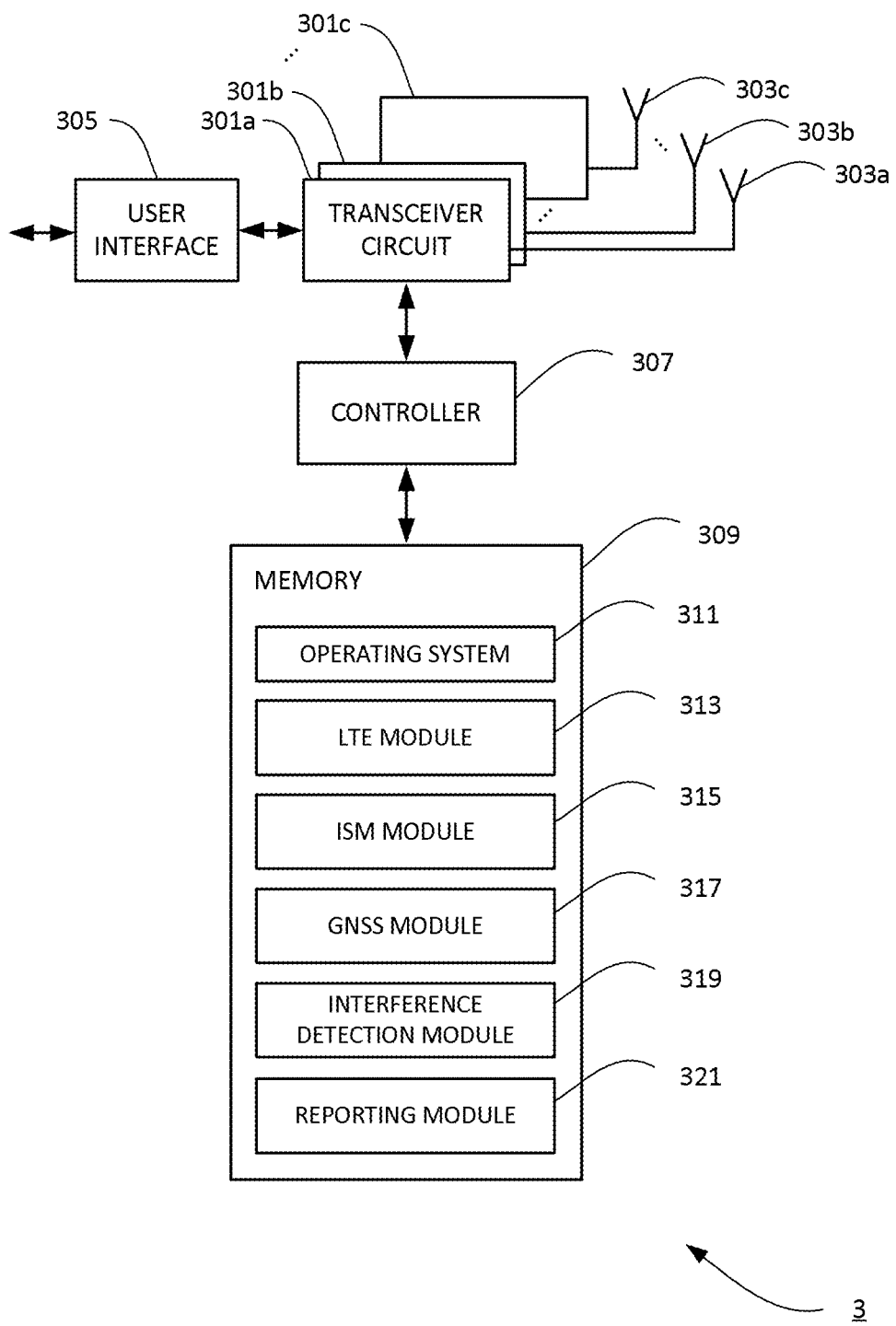
FIG. 4 is a block diagram of a mobile device forming part of the mobile telecommunication system shown in FIG. 1.

FIG. 4 is a block diagram of a mobile device 3 forming part of the mobile telecommunication system 1 shown in FIG. 1. As shown, the mobile device 3 includes transceiver circuits 301a to 301c which are operable to transmit signals to and to receive signals from the base station 5 via one or more antennas 303a to 303c. The mobile device 3 also includes a user interface 305 that is controlled by a controller 307 and which allows a user to interact with the mobile device 3.

The controller 307 controls the operation of the transceiver circuits 301a to 301c in accordance with software and data stored in memory 309. The software includes, among other things, an operating system 311, an LTE module 313, an ISM module 315, a GNSS module 317, an interference detection module 319, and a reporting module 321.

The LTE module 313 is operable to control the communications of the mobile device 3 using the LTE radio technologies. The LTE module 313 receives instructions from the base station 5 (via the LTE transceiver circuit 301a and the LTE antenna 303a) and stores them in the memory 309. Based on the received instructions, the LTE module 313 is operable to select the appropriate frequency band, transmission power, modulation mode etc. used in the LTE communications. The LTE module 313 is also operable to update the base station 5 about the amount and type of uplink and/or downlink data scheduled for transmission in order to assist the base station 5 in allocating resources among the mobile devices it is serving.

The ISM module 315 is operable to control the ISM communications of the mobile device 3. In doing so, the ISM module 315 might, for example, use data received from the access point 8 and/or communicate with the wireless headset 9.

The GNSS module 317 is operable to obtain a current geographic location of the mobile device 3 and to control the GNSS communications of the mobile device 3. In doing so, the GNSS module 317 might, for example, use data received from the positioning satellite 10.

Apart from the received control data, default control parameters are stored in the memory 309 and might be used by any of the LTE/ISM/GNSS modules 313 to 317 to control communications of the mobile device 3 as appropriate.

The interference detection module 319 is operable to detect interference caused to communications by the LTE module 313, the ISM module 315, and the GNSS module 317. In particular, the interference detection module 319 is operable to detect interference that has arisen due to coexisting communications by any of the LTE module 313, the ISM module 315, and the GNSS module 317. The interference detection module 319 may detect interference, e.g. by performing signal measurements, such as reference signal received power (RSRP), received power received quality (RSRQ) measurements, and the like. The interference detection module 319 may also detect interference by monitoring operation of the transceiver circuits 301a to 301c, for example to establish a measure of bit rate (or error rate, error count) for communications using the transceiver circuits 301a to 301c. The measured bit rate(s) might be established separately for uplink and downlink.

The reporting module 321 is operable to generate and send IDC assistance information to the base station 5. In order to do so, the reporting module 321 is operable to obtain data from the LTE module 313, the ISM module 315, the GNSS module 317, and/or the interference detection module 319 as appropriate. The reporting module 321 indicates the occurrence of in-device interference by sending an associated message to the base station 5 via the LTE transceiver circuit 301a. In this exemplary embodiment the message comprises a dedicated radio resource control (RRC) message (e.g. an RRC InDeviceCoexistence Indication message or the like) although any appropriate signalling may be used.

Macro Base Station

Figure 5:
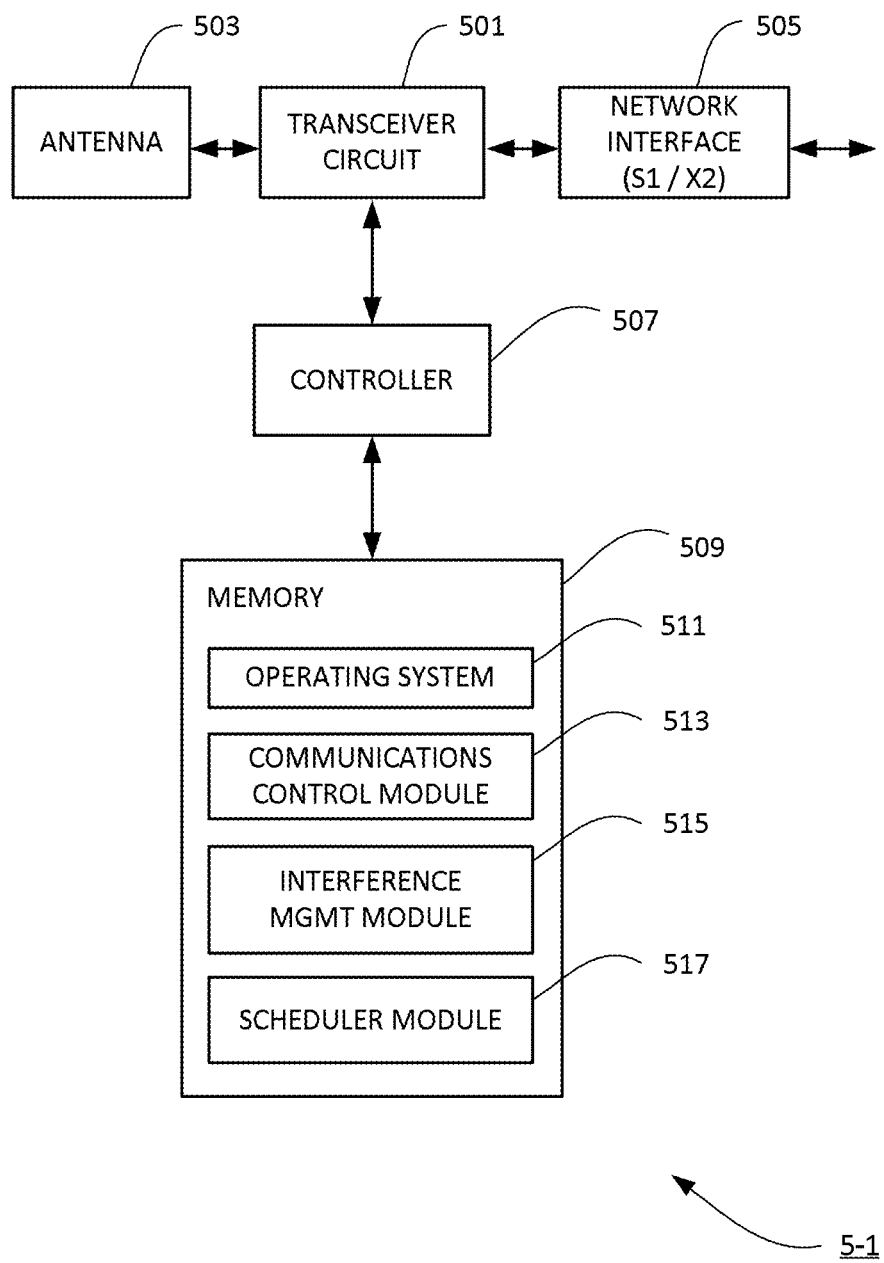
FIG. 5 is a block diagram of a macro base station forming part of the mobile telecommunication system shown in FIG. 1.

FIG. 5 is a block diagram of a macro base station 5-1 forming part of the mobile telecommunication system 1 shown in FIG. 1. As shown, the macro base station 5-1 includes a transceiver circuit 501 which is operable to transmit signals to and to receive signals from the mobile devices 3 via one or more antennas 503 and to transmit signals to and receive signals from the core network 7 and other base stations 5 (such as the pico base station 5-2) via a network interface 505 (which may be a copper or optical fibre interface). A controller 507 controls the operation of the transceiver circuit 501 in accordance with software and data stored in memory 509. The software includes, among other things, an operating system 511, a communications control module 513, an interference management module 515, and a scheduler module 517.

The communications control module 513 controls communications between the macro base station 5-1 and external devices via the transceiver circuitry 501 and the one or more antenna 503.

The interference management module 515 receives and handles the assistance information from the mobile devices 3. The interference management module 515 also obtains the information relating to the capabilities, preferences, operating parameters of neighbouring base stations 5 (such as pico base station 5-2) which is then stored in memory 509. The interference management module 515 is also operable to determine, based on the obtained assistance information and the information obtained from the neighbouring base stations 5, appropriate action to be taken to reduce IDC interference at the mobile device 3 for example by managing the allocation of time and/or frequency resources to the mobile devices 3 served by this macro base station 5-1 and/or by the pico base station 5-2 (in case of C/U Split is in place).

The scheduler module 517 is operable to receive and process requests from the mobile devices 3 for allocation of uplink and downlink resources. The scheduler module 517 is also operable to obtain information from the interference management module 515 identifying any interference reduction actions and takes these into account when allocating resources to the affected mobile devices 3.

Pico Base Station

Figure 6:
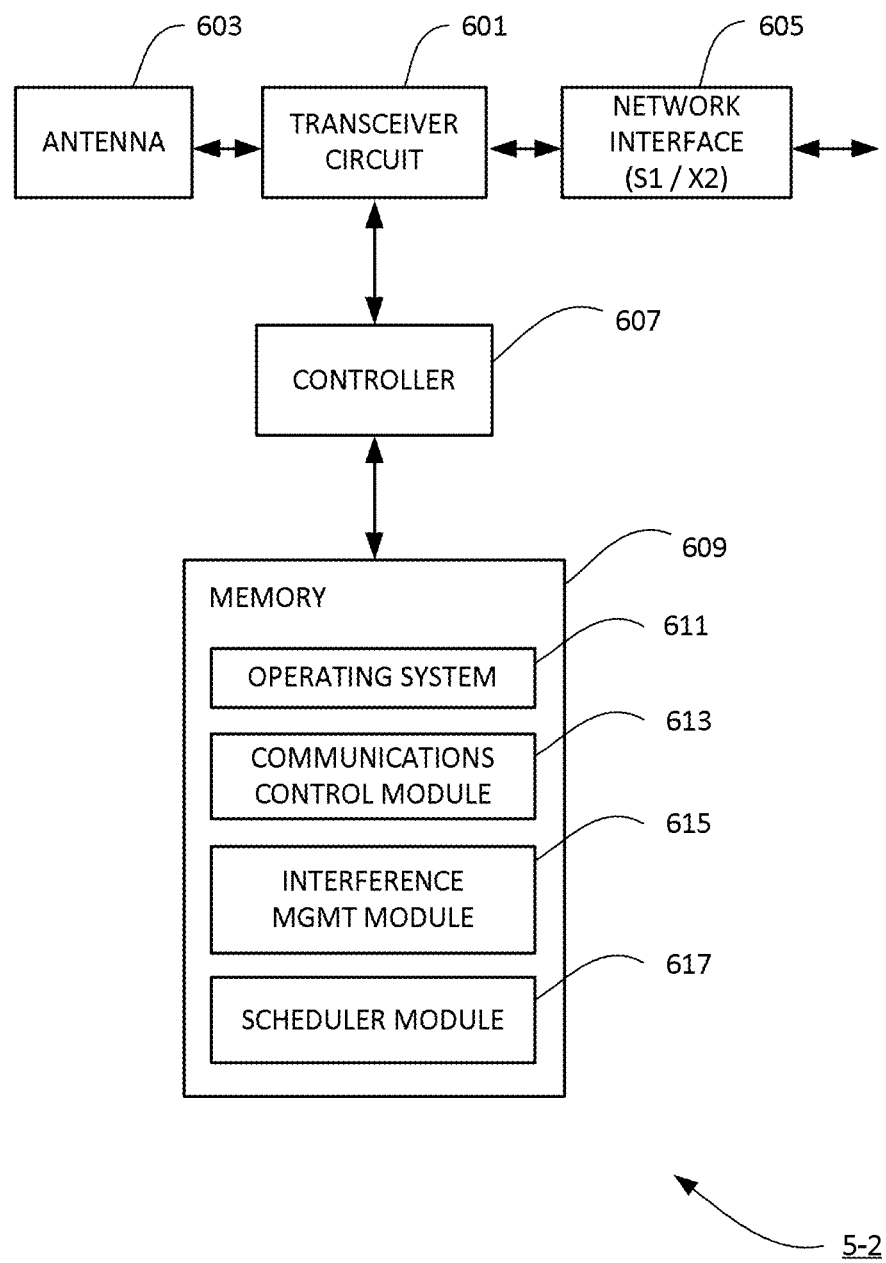
FIG. 6 is a block diagram of a low-power node forming part of the mobile telecommunication system shown in FIG. 1.

FIG. 6 is a block diagram of a pico base station 5-2 forming part of the mobile telecommunication system 1 shown in FIG. 1. As shown, the pico base station 5-2 includes a transceiver circuit 601 which is operable to transmit signals to and to receive signals from the mobile devices 3 via one or more antennas 603 and to transmit signals to and receive signals from the core network 7 and other base stations 5 (such as the macro base station 5-1) via a network interface 605 (which may be a copper or optical fibre interface). A controller 607 controls the operation of the transceiver circuit 601 in accordance with software and data stored in memory 609. The software includes, among other things, an operating system 611, a communications control module 613, an interference management module 615, and a scheduler module 617.

The communications control module 613 controls communications between the macro base station 5-1 and external devices via the transceiver circuit 601 and the one or more antenna 603.

The interference management module 615 receives and handles the assistance information from the mobile devices 3 (either directly or via the macro base station 5-1). The interference management module 615 also obtains the information relating to the capabilities, preferences, operating parameters of neighbouring base stations 5 (such as macro base station 5-1) which is then stored in memory 609. The interference management module 615 is also operable to determine, based on the obtained assistance information and the information obtained from the neighbouring base stations 5, appropriate action to be taken to reduce IDC interference at the mobile device 3 for example by managing the allocation of time and/or frequency resources to the mobile devices 3 served by this pico base station 5-2.

The scheduler module 617 is operable to receive and process requests from the mobile devices 3 for allocation of uplink and downlink resources. The scheduler module 617 is also operable to obtain information from the interference management module 615 identifying any interference reduction actions and takes these into account when allocating resources to the affected mobile devices 3.

In the above description, the mobile device 3 and the base stations 5 are described for ease of understanding as having a number of discrete modules (such as the communications control modules and the LTE/ISM/GNSS modules). Whilst these modules may be provided in this way for certain applications, for example where an existing system has been modified to implement the invention, in other applications, for example in systems designed with the inventive features in mind from the outset, these modules may be built into the overall operating system or code and so these modules may not be discernible as discrete entities.

Operation

Figure 7:
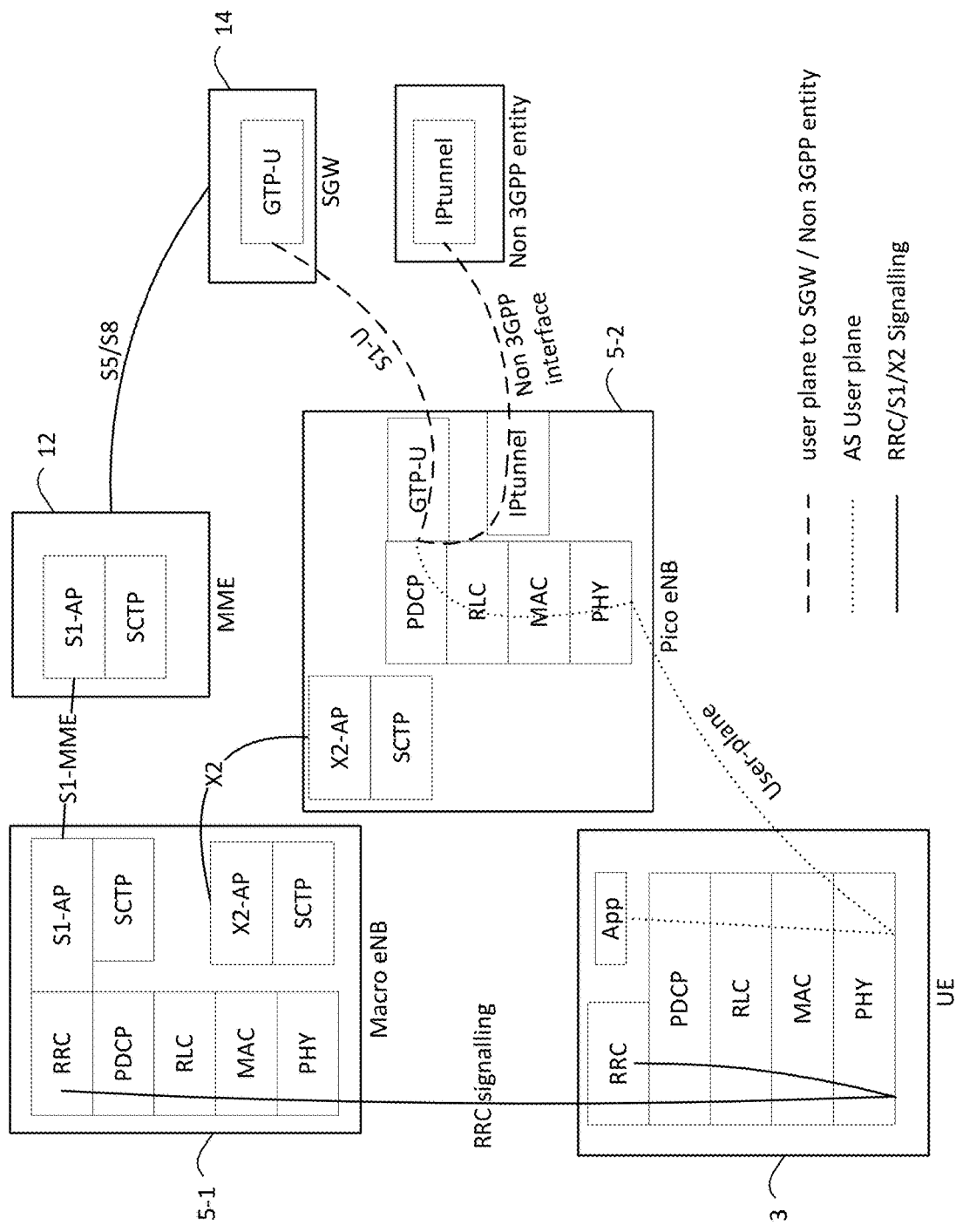
FIG. 7 is an overview of protocol stacks for implementing split control plane/user plane functionality by the elements of the mobile telecommunication system shown in FIG. 1.

FIG. 7 is an overview of the elements of the telecommunication system shown in FIG. 1 for implementing split control plane/user plane functionality. FIG. 7 also shows the respective protocol stacks of these network elements.

As can be seen in this figure, control plane connection is provided between the MME 12 and the macro base station 5-1 using S1-MME signalling (via the S1 interface) and between the macro base station 5-1 and the mobile device 3 using RRC signalling (via the air interface).

On the other hand, user plane connection is provided between the core network 7 and the pico base station 5-2 (via the S1 interface) and between the pico base station 5-2 and the mobile device 3 via the air interface (which is different than the one used for the control plane). Alternatively, if the pico base station 5-2 is not connected directly to the core network 7, Internet Protocol (IP) tunnelling may be used between the PGW 16 (FIG. 1) and the pico base station 5-2, e.g. via a Non 3GPP network.

The macro base station 5-1 and the pico base station 5-2 can communicate with each other via the X2 interface, for example, to exchange base station specific configurations and/or control data.

An S5/S8 interface is provided between the MME 12 and the SGW 14 in order to manage the routing of user plane data through the core network 7.

In this kind of architecture, at least the following scenarios may result in an IDC interference problem:

Scenario 0: A C/U Split is not yet configured via the pico base station 5-2. However, the frequency used by the pico base station 5-2 is near an ISM frequency and the mobile device 3 has already indicated interference problem relating to that frequency.

Scenario 1: The macro base station 5-1 provides the C-plane functionality and the pico base station handles the U-Plane traffic for the mobile device 3 (i.e. there is no user bearer via Macro cell). The frequency used by the pico base station 5-2 is near an ISM frequency.

Scenario 2: The macro base station 5-1 provides the C-plane functionality and handles at least one user plane bearer, e.g. Voice over IP (VoIP) or other high Quality of Service (QoS) bearer. The pico base station handles the other U-Plane traffic for the mobile device 3. The frequency used by the pico base station 5-2 is near an ISM frequency.

Scenario 3: The macro base station 5-1 provides the C-plane functionality and the pico base station handles U-Plane traffic for the mobile device 3. The frequency used by the macro base station 5-1 is near ISM frequency.

Scenario 3a: The macro base station 5-1 provides both the C-plane and the U-Plane functionalities for the mobile device 3 (no C/U Split has been configured initially). The frequency used by the macro base station 5-1 is near ISM frequency.

Scenario 4: The macro base station 5-1 provides C-plane functionality and handles at least one user plane bearer, e.g. VoIP or other high QoS bearer. The pico base station 5-2 handles other U-Plane traffic for the mobile device 3. The frequency used by the macro base station 5-1 is near ISM frequency.

Scenario 5: Both the frequency used by the macro base station 5-1 and the frequency used by the pico base station 5-2 are near one or more ISM frequencies (e.g. band 7 and/or band 40).

Figure 8:
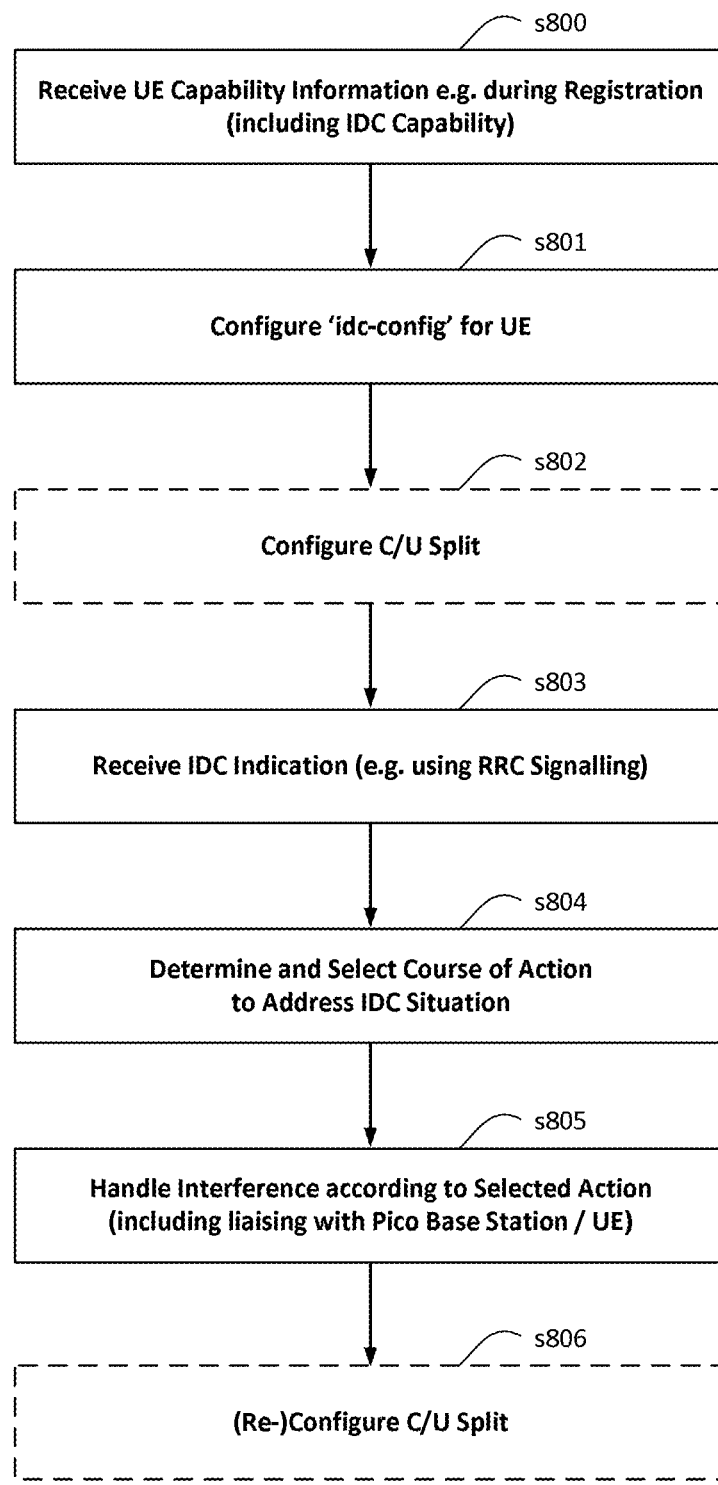
FIG. 8 is an exemplary flowchart illustrating a method performed by the base station forming part of the mobile telecommunication system shown in FIG. 1.

In the following, with reference to FIG. 8, possible solutions are described for each interference scenario mentioned in the above list.

Scenario 0

In the case when a C/U Split has not been configured for a particular mobile device 3 yet, the base stations 5 and the mobile device 3 can advantageously alleviate interference as follows:

1) The mobile device 3 informs the macro base station 5-1 about its IDC capability, (e.g. during registration with that macro base station 5-1) (step S800). Although not shown in FIG. 8, the macro base station 5-1 also has also obtained information relating to the operation of its neighbouring base stations (e.g. during an X2 setup procedure between them), including the pico base station 5-2.

2) The macro base station 5-1 configures the 'idc-config' settings for the mobile device 3 (step S801). The macro base station 5-1 takes into account any previously received IDC indication and any information relating to the operating frequency of the pico base station 5-2 (i.e. on a frequency (such as Band 7 and Band 40) near to ISM band). Since their respective E-UTRA Absolute Radio Frequency Channel Numbers (EARFCNs) have already been exchanged during the initial setup of the X2 interface between the base stations 5, there is no need to exchange new information between the base stations 5 in order to determine whether or not there is an IDC problem.

Since C/U Split has not yet been configured for this mobile device 3, step S802 has not yet been performed in this scenario.

3) The macro base station 5-1 receives an IDC indication (e.g. in an 'RRC: IDC Indication' message) from the mobile device 3 indicating that the frequency used by the pico base station 5-2 suffers from interference (step S803). The mobile device 3 may generate and send such indication when, for example, the 'idc-config' settings provided by the macro base station 5-1 did not sufficiently alleviate the IDC interference experienced (for example, arising from interference that has, in effect, not yet been indicated).

4) Using the information available to it, the macro base station 5-1 determines the best course of action, such as, for example:

preventing configuration of C/U-split for this mobile device 3 (if an FDM solution is to be used);

choosing another cell operating at a different frequency for configuring the C/U split for this mobile device 3 (when a different FDM solution is to be used);

applying a TDM solution (discussed in more detail below for scenario 1).

If the macro base station 5-1 is already in the process of configuring a C/U-split for this mobile device 3 (e.g. if steps S802 and S803 are performed substantially concurrently) then it may decide to terminate the C/U split procedure and choose a different strategy from the above options.

5) The macro base station 5-1 (possibly involving the mobile device 3 and/or the pico base station 5-2) handles the indicated interference (step S805) according to the course of action selected in step S804. Further, if the macro base station 5-1 determines that it is beneficial (or possible) to do so, it configures a C/U Split for the mobile device 3 (step S806), when appropriate, also taking into account any information available to it.

Scenarios 1 and 2

In this case, C/U Split is in place and interference has arisen on a frequency used by the pico base station 5-2, regardless whether or not the macro base station 5-2 is also providing a user plane connection for the mobile device 3. In this case, the following approach may be used:

Steps 1) and 2) (i.e. steps S800 and S801 of FIG. 8) are the same as described for scenario 0 above.

3) The macro base station 5-1 configures the C/U Split for the mobile device 3 without being aware of a potential interference on the selected pico base station's 5-2 band (step S802).

4) When IDC interference is detected by the mobile device 3, which it cannot solve by itself, the mobile device 3 generates and sends an IDC indication (e.g. and 'RRC: IDC Indication' message) to the macro base station 5-1 (step S803).

5) The macro base station 5-1 selects an appropriate IDC solution (step S804):

FDM solution—the macro base station 5-1 selects another small cell upon receipt of an IDC indication for the currently used small cell:
  hand over the user plane connection from the current pico base station 5-2 to a different pico base station operating on a different frequency (e.g. based on associated EARFCN obtained during X2 setup) than the frequency used by the current pico base station 5-2;
  instead of handing over the user plane connection, the macro base station 5-1 may simply release the user plane bearer at the current pico base station 5-2 and (re-)establish it via a different pico base station (which may be selected, e.g. using EARFCN or the like);
  hand over the user plane connection to a cell of the macro base station 5-1 (i.e. combine the user plane and control plane bearers whilst also ensuring service continuity for user plane traffic);
  release the user plane bearer at the pico base station 5-2 and (re-) establish it via a cell of the macro base station 5-1 (i.e. combine the user plane and control plane bearers without ensuring service continuity for user plane traffic).

TDM solution—the macro base station 5-1 maintains the user plane connection via the current small cell upon receipt of an IDC indication but changes the timing of user plane transmissions in that cell, according to the following possibilities:
  The macro base station 5-1 may configure an 'autonomous denial rate' for the mobile device 3 to be applied for its communications via the pico base station 5-2. Generally, autonomous denial rate (as specified in 3GPP TS 36.331) defines a number 'x' of sub-frames per a number 'y' sub-frames that the mobile device 3 is allowed to skip even if resources have been scheduled for transmissions by that particular mobile device 3. The value of 'x' may be selected from the set {2, 5, 10, 15, 20, 30} and the value of 'y' may be selected from the set {200, 500, 1000, 2000}. By skipping scheduled (and hence expected) LTE transmissions, the mobile device 3 is able to carry out non-LTE transmissions without interference (as the LTE and non-LTE communications do not happen at the same time). Autonomous denial can thus mitigate the effects of IDC interference, but only up to the limit defined by the autonomous denial rate configured for the mobile device 3. Further, the autonomous denial rate is typically applied for all communications by the mobile device 3. In this case, however, the macro base station 5-1 advantageously configures the mobile device with an autonomous denial rate specific to transmissions over the cells of the pico base station 5-2. This approach makes it possible for the mobile device 3 to communicate over the (problematic) frequency used in the pico base station's 5-2 cell without violating its existing autonomous denial rate configuration (which it would still apply to communications via other base stations than the pico base station 5-2).

The macro base station 5-1 may use TDM assistance information provided by the mobile device 3. Since the DRX configuration (i.e. settings for periodically switching off the mobile device's 3 transceiver circuit 301, usually to save energy, but in this case to mitigate the effects of interference) and/or the Hybrid Automatic Retransmission reQuest (HARQ) configuration (i.e. the settings which enable error correction to be adapted dynamically depending on channel quality) are under the control of the pico base station 5-2, the mobile device 3 is not configured to provide such information to the macro base station 5-1. In this case, however, the macro base station 5-1 may advantageously obtain the TDM assistance information from the pico base station 5-2 and take it into account when configuring that particular mobile device 3. This allows solving the interference problem without requiring direct communication of the TDM assistance information between the mobile device 3 and the macro base station 5-1 (which might not be feasible anyway since this type of information is usually exchanged using the bearer to which it applies, i.e. in this case the bearer(s) between the mobile device 3 and the pico base station 5-2). The macro base station 5-1 may identify the appropriate TDM assistance information to be used (from all the TDM assistance information available to it) by comparing the frequency(-ies) reported by the mobile device 3 (i.e. in the IDC assistance information) to the frequencies used by its neighbours, including the pico base station 5-2 which the IDC assistance relates to in this scenario.

Although in this scenario there is no interference problem for the frequency used in the macro base station's 5-1 cell, and hence no IDC related configuration and/or reporting is carried out between the macro base station 5-1 and the mobile device 3 (i.e. step S803 is received indirectly, via the pico base station 5-2), the macro base station 5-1 is still able to determine an appropriate course of action (in step S804) and carry out configuration of IDC parameters for the bearers of the pico base station 5-2 carrying user plane communications for that mobile device 3 (in step S805). If the macro base station 5-1 determines that it is beneficial to do so, it is able to reconfigure the C/U Split for the mobile device 3 (step S806), also taking into account any of the above information.

Scenario 3

In this case, interference has arisen on a frequency used by the macro base station 5-1. In this case, the following approach may be used:

The first two steps (i.e. steps S800 and S801 of FIG. 8) are the same as described for scenario 0 above. Subsequently, the macro base station 5-1 configures C/U Split for the mobile device 3 (step S802).

Consequently, the macro base station 5-1 provides the control plane and the pico base station 5-2 provides the user plane for the mobile device 3 at the time when interference is detected by the mobile device 3 on the frequency used by the macro base station 5-1.

In this case, the mobile device 3 may advantageously deny ISM transmissions whenever it needs to send RRC signalling, such as when it provides IDC indication. Therefore, the mobile device 3 is able to transmit the necessary IDC indication to the macro base station 5-1 (step S803), even though the interference is detected for the frequency that is used for this transmission. Further, even if the mobile device 3 is communicating via the user plane, in this case there is no need to provide (direct) IDC indication to the pico base station 5-2 which provides the mobile device's 3 user plane connection. Unnecessarily disruptions to user plane communications can therefore be avoided.

The macro base station 5-1 may determine the appropriate course of action to avoid the indicated interference based in the received IDC indication (step S804) and configure the mobile device 3 appropriately (step S805), e.g. by applying a TDM solution to the macro cell only.

Scenario 3a

In this case, the macro base station 5-1 provides all configured communication bearers (both control plane and user plane). In this case, the IDC indication is received (in step S803) before a C/U Split is configured for the mobile device 3 (i.e. before step S802 is performed).

In this scenario, since the macro base station 5-1 is able to determine (in step S804) from the received IDC indication (and the information shared with its neighbours) that the selected pico base station 5-2 is not affected by the indicated IDC situation. Therefore, the macro base station 5-1 configures a C/U Split for the mobile device (steps S805 and S806). This advantageously ensures that the mobile device 3 needs to send only RRC signalling (a relatively small amount of data) over the carrier (macro cell) experiencing interference and send user plane data over a carrier of the pico base station 5-2 (which has not been indicated to suffer from interference).

For the cell(s) of the macro base station 5-1, the solutions presented for scenario 3 also apply.

Scenario 4

In this case, interference has arisen on a frequency used by the macro base station 5-1, which provides both control plane communications and at least part of the user plane communications for the mobile device 3.

In this case, traffic over the macro cell may be higher than in case of scenario 3. However, the mobile device 3 is still able to deny ISM transmissions while it is transmitting (or receiving) voice packets and/or RRC signalling. Therefore, the solutions described for scenarios 3 and 3a also apply for scenario 4.

Scenario 5

In this case, the frequencies used by both the macro base station 5-1 and the pico base station 5-2 are suffering interference. This may happen, for example, when the base stations 5 use frequency bands (e.g. LTE band 7 and/or LTE band 40) near the ISM frequency bands.

In this scenario, both control plane and user plane communications for the mobile device 3 would be disturbed by the interference, regardless whether or not C/U Split has been configured.

In this exemplary embodiment, the mobile device 3 is configured to report TDM assistance information for the Scell in addition to reporting such information for the Pcell. In order to do this, two sets of discontinuous reception configuration ('drx-config') parameters (e.g. a 'drx-config-r11_Pcell' and a 'drx-config-r11_Scell') are provided (e.g. in response to an indicated IDC situation) to the mobile device 3 so that it can use different configurations for the macro cell and the small cell, if necessary. Having a dedicated respective TDM configuration associated with the Pcell and with the Scell advantageously allows the mobile device 3 to mitigate the effects of the IDC interference.

Accordingly, notwithstanding that this is a relatively uncommon scenario, this provides a distinct benefit over a system in which the mobile device reports TDM assistance information for the macro cell only (which is not applicable for the small cell even though, in this scenario, the macro cell and the small cell exist on the same carrier or on adjacent carriers).

The macro base station 5-1 and the pico base station 5-2 maintain synchronisation of the above parameters between each other (e.g. as part of the X2 communication procedures between them).

Modifications and Alternatives

A detailed exemplary embodiment has been described above. As those skilled in the art will appreciate, a number of modifications and alternatives can be made to the above exemplary embodiment whilst still benefiting from the inventions embodied therein.

In the above exemplary embodiment, a mobile telephone based telecommunications system was described. As those skilled in the art will appreciate, the reporting and interference avoidance techniques described in the present application can be employed in other communications system. Other communications nodes or devices (both mobile and stationary) may include user devices such as, for example, personal digital assistants, smartphones, laptop computers, web browsers, etc.

In the above exemplary embodiments, a number of software modules were described. As those skilled will appreciate, the software modules may be provided in compiled or un-compiled form and may be supplied to the base station or to the mobile device as a signal over a computer network, or on a recording medium. Further, the functionality performed by part or all of this software may be performed using one or more dedicated hardware circuits. However, the use of software modules is preferred as it facilitates the updating of base station 5 and the mobile device 3 in order to update their functionalities.

In the above examples, the Radio Access Technologies employed by the base stations 5 operate according to either Frequency Division Duplexing (FDD) mode or Time Division Duplexing (TDD) mode. However, it will be appreciated that the base stations 5 might also operate according to any other suitable technique.

In the above exemplary embodiments, the concurrent LTE and non-LTE communications are carried out by the same mobile device 3. However, whilst the above exemplary embodiments have particular benefit for alleviating in device coexistence interference issues, it will be appreciated that some aspects of the invention may be employed to alleviate interference in situations where one mobile device communicates using the LTE RAT and another but separate device in the vicinity communicates using a non-LTE radio technology.

In the above exemplary embodiments, the mobile device 3 comprises separate LTE, GNSS, and ISM baseband circuits 300a to 300c. Each baseband circuit 300a to 300c is coupled to its own radio frequency transceiver circuit 301a to 301c and uses its dedicated antenna 303a to 303c. It will be appreciated that some or all of the baseband circuits 300a to 300c, some or all of the transceiver circuits 301a to 301c, and some or all of the antennas 303a to 303c might be combined in one component. Alternatively, the mobile device 3 might employ separate circuits and/or separate transceivers and/or separate antennas for each type of RAT that it supports. For example, although both Bluetooth and Wi-Fi are ISM radio access technologies, some mobile devices implement these standards using separate circuits and/or separate transceivers and/or separate antennas. It is also possible that a given RAT requires more than one antenna or uses a separate transmitter and/or receiver part. It is also possible that in addition to the LTE functionality, some mobile devices implement GNSS functionality only, whilst other mobile devices might implement ISM functionality only.

The exemplary embodiments have been described using ISM transceivers as an example of non-LTE radio technologies. However, the mechanisms described herein can be applied to other non-LTE radio technologies (e.g. GNSS).

List of ISM technologies:
Bluetooth devices;
Cordless phones;
Near field communication (NFC) devices;
Wireless computer networks, such as HIPERLAN, Wi-Fi (IEEE 802.11);
Wireless technologies based on IEEE 802.15.4, such as ZigBee, ISA100.11a, WirelessHART, and MiWi.

List of GNSS technologies:
Global or regional satellite navigation systems, such as GPS, GLONASS, Galileo, Compass, Beidou, DORIS, IRNSS, and QZSS;
Global or regional Satellite Based Augmentation Systems, such as Omnistar, StarFire, WAAS, EGNOS, MSAS, and GAGAN;
Ground based augmentation systems, such as GRAS, DGPS, CORS, and GPS reference stations operating Real Time Kinematic (RTK) corrections.

In the above exemplary embodiments, the IDC assistance information have been described as indicating either one of an interference relating to the control plane, an interference relating to the user plane, a cell experiencing interference, a frequency band experiencing interference, whether any autonomous corrective actions have been applied by the mobile device. It will be appreciated that the assistance information might include, or be obtained from, any of the following information types or any combination of these as well:
current interference level
maximum allowed interference level
mean interference level
indication of a type of non-LTE RAT being used
indication of a type of non-LTE RAT suffering interference
indication of a non-preferred RAT mode
indication of a preferred RAT mode
ISM duty cycle
ISM channels being used
LTE carrier frequency band(s) and/or sub-carrier(s) suffering interference
LTE carrier frequency band(s) and/or sub-carrier(s) not suffering interference
level of interference across a number of LTE carrier frequency band(s) and/or sub-carrier(s)

In the above exemplary embodiments, the interference issues have been described with respect to one device operating both the LTE and the ISM/GNSS transceivers. However, it will be appreciated that the exemplary embodiments are applicable to interference issues involving multiple devices, e.g. one device operating an LTE transceiver and another device operating an ISM or a GNSS transceiver. The exemplary embodiments are also applicable to mobile devices which do not have any ongoing LTE transmissions (but e.g. their ISM or GNSS transmission suffers from interference) and which employ LTE signalling only for the duration of sending assistance information to a serving base station which is able to manage the interference.

At the discussion of step S803, the IDC indication was embedded in an "InDeviceCoexistence" RRC signalling message. Alternatively, the IDC indication might be sent using a different signalling message.

In the above description of scenario 5, the 'drx-config-r11_Pcell' and 'drx-config-r11_Scell' information elements are used for the macro cell and the small cell, respectively. However, it will be appreciated that different information elements might be used, for example 'drx-config-r12_Pcell' and 'drx-config-r12_Scell', respectively. Alternatively, 'drx-config-r8_Pcell' and 'drx-config-r11_Scell' might be used, thus maintaining compatibility in the macro cell for legacy user equipment.

Although not shown in FIG. 7, in some cases the user plane connection may be routed between the pico base station 5-2 and the core network 7 (e.g. SGW 12) via the macro base station 5-1, i.e. using the X2 interface provided between them. However, in this case a so-called 'ideal backhaul' connection might be required between the macro base station 5-1 and the pico base station 5-2 in order to ensure smooth operation (i.e. very high throughput and very low latency). The specifications of an 'ideal backhaul' can be found in section 6.1.3 of 3GPP TR 36.932 (v.12.1.0), the contents of which are incorporated herein by reference.

In accordance with the above, therefore, the macro base station may trigger consolidation of already split user plane (bearers) under its own control in cases where e.g. the pico frequency experiences ISM, and the pico base station does not support a TDM solution. The macro and pico base station may provide reconciled parameters for autonomous denial and TDM configuration to the UE and UE may then comply with these configurations for each bearer. The UE may provide assistance information for both macro and pico cell bearers. The macro base station may be provided with information to allow it to determine if the pico base station supports a TDM solution, autonomous denial etc.

It will be appreciated that pico cell related parameters, such as its ability to support a TDM solution, autonomous denial etc., may be provided by the UE to the macro base station or by the MME to the macro base station. This information may be sent via user plane.

The macro and pico base stations may be able to exchange the capability of a pico cell to support a TDM solution for an IDC problem directly. For example, a macro and pico base station may exchange:

idc-config (direction: pico base station to and from macro base station) including, for example, the autonomous denial rate to be sent from the pico base station to the macro base station and the idc-config sent to the UE from the macro base station to be informed to pico base station pico eNB;

UE IDC indication and tdm-assistance information (direction: macro base station to the pico base station)

UE DRX config and subframe config (direction: macro base station to and from the pico base station)

Further details concerning the information that may be exchanged between the macro base station 5-1 and the pico base station 5-2 are described in more detail in Table 1 below, whilst details of information that may be exchanged between the network entities and the mobile device 3 are described in Table 2 below in more detail.

TABLE 1

Information to be exchanged between the macro base station 5-1 and the pico base station 5-2

| IE name | Information | Direction |
| --- | --- | --- |
| Pico IDC capability | Macro eNB obtains information relating to Pico eNB's support for TDM solution and/or autonomous denial.<br>directly: using X2 signalling (e.g. "X2: Setup" message)<br>indirectly: via O&M | Pico –> Macro |
| Autonomous denial parameters | Parameters as defined in 36.331.<br>Macro eNB informs Pico eNB about autonomous denial parameters configured for the UE if Pico provides the user plane. Alternatively, Pico eNB informs its preferred autonomous denial parameters to Macro eNB and also to the UE. | Macro –> Pico<br>Pico –> Macro |
| UE assistance information | UE reports assistance information (to Macro eNB) for the small cell (operated by the Pico eNB).<br>Macro eNB sends DRX and subframe pattern provided by the UE to Pico eNB. | Macro –> Pico Macro eNB may modify contents before sending them to Pico eNB |
| drx-config_Scell | Configuration may be selected by the Pico eNB in response to instruction to apply TDM solution; or Macro eNB may suggest parameters for approval by the Pico eNB. | Pico –> Macro |
| subframepattern | Configuration selected by Pico in response to apply TDM solution | Pico –> Macro |

TABLE 2

Information to be exchanged between network entities and the mobile device 3

| IE name | Information | Direction |
| --- | --- | --- |
| drx-config-r11_Pcell OR drx-config-r12_Pcell | Existing drx-config-r11 could also be used for Pcell without any change in ASN.1 (ASN: abstract syntax notation used in encoding/decoding message contents sent over the air interface) | Network –> UE |
| drx-config-r11_Scell OR drx-config-r12_Scell | IE comprising the same set of parameters as defined for 'drx-config-r11' but in this case for setting up IDC specific DRX for the Scell only | Network –> UE |
| drx-config_Scell (or Picocell) OR drx-config_Scell | Drx-config IE exists from Rel-8 and is applicable per UE (for all its cells). In this case, it is applied for the Pcell only.<br>In case IDC DRX is configured for macro and normal Rel-8 DRX needs to be configured for Scell, new IE is needed and we name it drx-config_scell | Network –> UE These above IEs will allow different DRX configuration for Macro and Pico cell |
| tdm-assistanceinformationScell | This IE allows the UE to report TDM assistance information for the Scell (Pico eNB) | UE –> Network |
| subframepatternIndication | This IE indicates if subframe pattern is for Pcell or Scell (or both). | Network –> UE |
| autonomousDenialParameters-r11_Picocell (or Scell) OR autonomousDenialParameters-r12_Picocell | Configuration parameters applicable for the small cell (Pico eNB) | Network –> UE |

Glossary of 3GPP Terms

BT Bluetooth
DRX Discontinuous Reception
eNB Evolved NodeB—base station
E-UTRA Evolved UMTS Terrestrial Radio Access
E-UTRAN Evolved UMTS Terrestrial Radio Access Network
FDM Frequency Division Multiplexing
GNSS Global Navigation Satellite System
GPS Global Positioning System
IDC interference avoidance for In Device Coexistence
ISM Industrial, Scientific and Medical (radio bands)
LTE Long Term Evolution (of UTRAN)
RAT Radio Access Technology
RRC Radio Resource Control
RRM Radio Resource Management
Rx Receiver
SIR Signal to Interference Ratio
TDM Time Division Multiplexing
Tx Transmitter
UE User Equipment
DL Downlink—link from base station to mobile device
UL Uplink—link from mobile device to base station

The invention claimed is:

1. A method performed by a user equipment (UE), the method comprising:
communicating with a first base station and a second base station via a plurality of carriers using a first radio access technology;
communicating with a wireless communication device using a second radio access technology;
detecting in-device coexistence (IDC) interference corresponding to the second base station based on coexistence of the first radio access technology and the second radio access technology;
transmitting, to the first base station, in a Radio Resource Control (RRC) message an IDC indication including information identifying a type of the second radio access technology;
wherein the IDC interference is addressed based on allocation of at least one physical resource block (PRB) within one of the plurality of carriers and outside a frequency range of the second radio access technology.

2. A method performed by a first base station, the method comprising:
communicating with a user equipment (UE) via at least one of a plurality of carriers using a first radio access technology, wherein the UE is configured to communicate with a second base station via at least one of the plurality of carriers using the first radio access technology and communicate with a wireless communication device using a second radio access technology;
receiving, from the UE, an in-device-coexistence (IDC) indication in a Radio Resource Control (RRC) message, in a case where the UE detects an IDC interference corresponding to the second base station based on coexistence of the first radio access technology and the second radio access technology in the UE, the IDC indication including information identifying a type of the second radio access technology; and
addressing the IDC interference by allocating at least one physical resource block (PRB) within one of the plurality of carriers and outside a frequency range of the second radio access technology.

3. A user equipment (UE) comprising:
at least one memory configured to store instructions; and
at least one processor configured to process the instructions to:
communicate with a first base station and a second base station via a plurality of carriers using a first radio access technology; and
communicate with a wireless communication device using a second radio access technology;
detect in-device coexistence (IDC) interference corresponding to the second base station based on coexistence of the first radio access technology and the second radio access technology, and
transmit, to the first base station, in a Radio Resource Control (RRC) message, an IDC indication including information identifying a type of the second radio access technology;
wherein the IDC interference is addressed based on allocation of at least one physical resource block (PRB) within one of the plurality of carriers and outside a frequency range of the second radio access technology.

4. A first base station comprising:
at least one memory configured to store program instructions; and
at least one processor configured to process the instructions to:
communicate with a user equipment (UE) via at least one of a plurality of carriers using a first radio access technology, wherein the UE is configured to communicate with a second base station via at least one of the plurality of carriers using the first radio access technology and communicate with a wireless communication device using a second radio access technology;
receive, from the UE, an in-device-coexistence (IDC) indication in a Radio Resource Control (RRC) message, in a case where the UE detects an IDC interference corresponding to the second base station based on coexistence of the first radio access technology and the second radio access technology in the UE, the DC indication including information identifying a type of the second radio access technology; and
address the IDC interference by allocating at least one physical resource block (PRB) within one of the plurality of carriers and outside a frequency range of the second radio access technology.

5. A non-transitory computer readable medium comprising computer implementable instructions for causing a programmable device to perform the method of claim 1.

6. A non-transitory computer readable medium comprising computer implementable instructions for causing a programmable device to perform the method of claim 2.

* * * * *